Patented Feb. 24, 1942

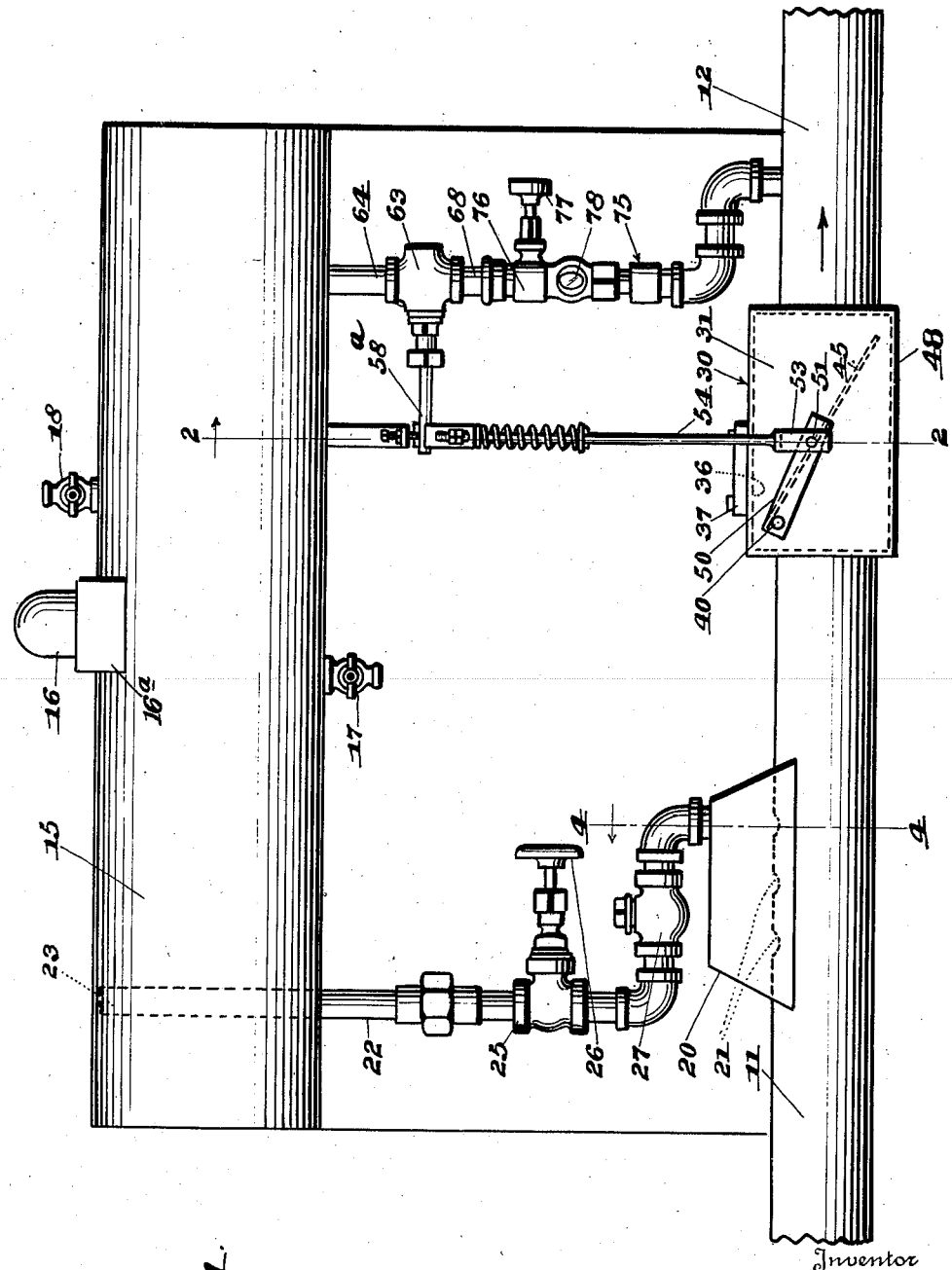

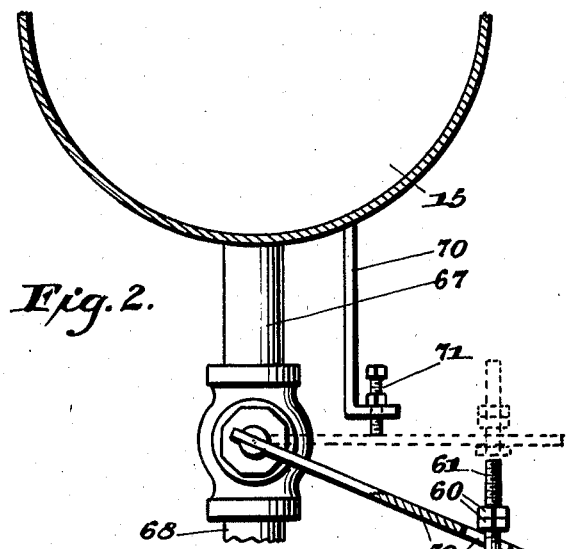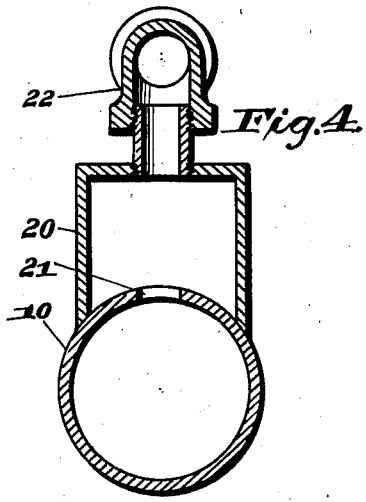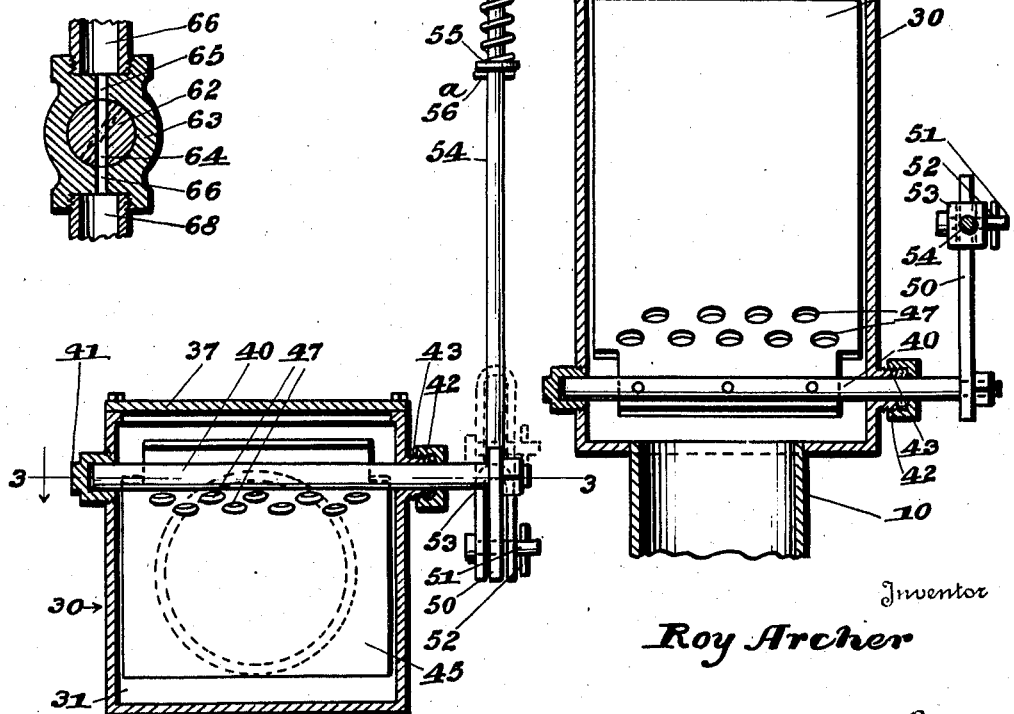

2,274,029

UNITED STATES PATENT OFFICE 2,274,029

FLOW RESPONSIVE DEVICE

Roy Archer, Winfield, Kans.

Application November 7, 1938, Serial No. 239,415

1 Claim. (Cl. 73—228)

This invention relates to a device for treating oil.

An object of the invention is to provide a device which responds to the amount of liquid flowing through a flow line conveying oil and gas in which the response of said device is substantially unaffected by the gas contained therein.

This invention will be best understood from a consideration of the following detailed description, in view of the accompanying drawings forming a part of the specification; nevertheless, it is to be understood that the invention is not confined to the disclosure, being susceptible of such changes and modifications as define no material departure from the salient features of the invention as expressed in the appended claim.

In the drawings:

Figure 1 is a view in elevation of a unit for supplying chemicals automatically to a pipe line constructed in accordance with the principles of my invention, Figure 2 is a vertical section taken along the line 2—2 of Figure 1, Figure 3 is a horizontal section taken along the line 3—3 of Figure 2, Figure 4 is a vertical section taken along the line 4—4 of Figure 1, and Figure 5 is a fragmentary vertical section of the valve shown in Figure 2.

Referring more particularly to the drawings, 10 designates a pipe line or conduit which has one end 11 connected with the source of oil under pressure while the other end 12 extends to a storage tank or a treating tank. The oil which is forced through the pipe line 10 carries with it gas under pressure.

A tank 15 is supported in any convenient manner above the pipe line 10 and is adapted to store the chemical solution which is adapted to be supplied to the liquid flowing through the pipe line 10 in predetermined quantities. The upper end of the tank is provided with a removable plug 16 whereby the tank may be filled with the chemical solution. The bottom of the tank is provided with a pet cock 17 for draining the tank. The top of the tank is provided with a pet cock 18 for relieving pressure within the tank when it is desired.

A hood 20 is supported upon the top of the pipe line 10 and has its edges secured to the top of the pipe whereby the hood will be sealed against the loss of fluids. It will be noted that the pipe 10 is provided with a plurality of openings 21 for connecting the upper portion of the pipe line 10 with the hood 20. A pipe, generally designated by the numeral 22, connects the top of the hood 20 with the tank 15 so that gases may pass from the pipe line 10 to the tank 15 above the level of the liquid maintained in said tank.

A valve, generally designated by the numeral 25, is incorporated in the pipe 22, and a handle 26 is adapted to be manipulated for closing or opening the valve to open or close the pipe 22 to the hood 20.

A check valve 27 is also incorporated in the pipe 22 between the valve 25 and the hood 20 and is adapted to prevent the return of any fluids from the tank 15 to the pipe line 10.

A casing 30 which may be of any shape, but in this case is shown as rectangular in cross section, is included in the pipe line 10 to form a control chamber 31. It will be noted that the pipe line 10 is cut at this point and the ends of the section of the pipe are secured in any approved manner to openings at the opposite ends of the casing 30. The casing is provided with an opening in its top, as shown at 36, and this opening is normally closed by a cover plate 37.

A shaft 40 has one end mounted in a bearing 41 formed on one side wall of the casing 30, as shown in Fig. 2. The other end of the shaft extends through the opposite side wall of the casing 30 and is sealed by a packing gland 42 carried by a threaded nipple 43 projecting from said side wall.

An oscillating plate 45 is rigidly connected to the shaft 40 and located within the casing 30. This plate has substantially the same width as the inner chamber 31 of the casing 30 and has its free end 46 normally resting upon a bottom 48 of the casing when there is no liquid flowing through the pipe line 10. The elevated end of the plate 45 adjacent to its connection with the shaft 40 is provided with a plurality of perforations 47 through which gases present in the pipe line may pass when there is no liquid flowing in said line whereby the plate and its associated parts will not be operated. However, a certain amount of the liquid may be returned past this plate through the openings 47 and at the sides of the plate. In other words, the plate 45 does not act as a check valve to prevent the reverse flow of liquid in the pipe line 10 but merely acts as an operating means for a purpose which will be presently explained.

A lever 50 is rigidly secured to the projecting end of the shaft 40 and carries a pin 51 which is held in place by a cotter pin 52 at the outer free end of the lever. A yoke 53 is pivotally connected with the pin 51 and a rod 54 extends upwardly from the yoke and is integrally connected with said yoke so that when the lever 50 is oscillated the rod 54 will be reciprocated.

A collar 55 is supported by the pin 56ª carried by the rod 54 and supports the lower end of a spring 56 which embraces the upper end of the rod. The upper end of the spring abuts a second collar 57 which is slidably mounted on the rod and engages the underface of a lever 58 which has an elongated opening 59 to receive the rod 54. A pair of nuts 60 are screwed onto the upper threaded end 61 of the rod 54 and the lowermost nut engages the upper face of the lever 58.

The opposite end of the lever 58 is rigidly secured to a shaft 58a which projects from a valve 62 mounted within the casing 63, and this valve is provided with a diametrically disposed slot 64 which is adapted to align with ports 65 and 66 formed in the casing 63. The port 65 opens into a pipe 67 that is in communication with the lower end of the storage tank 15. The port 66 is in communication with a pipe 68 that communicates with a pipe line 75.

A bracket 70 depends from the bottom of the tank 15 and is provided with an adjustable stop 71 adapted to engage the upper face of the lever 58 and retain the lever in a horizontal position so that the slot 64 of the valve 62 will be in full communication with the ports 65 and 66.

The pipe 68 is in communication with the pipe line, generally designated by the numeral 75 and this pipe line includes a valve 76 operated by a handle 77. This line also includes a sight window 78 through which liquid may be seen after it passes the valve 76 on its way to the bottom of the pipe line 75 where it is conducted to the pipe line 10 beyond the casing 31.

Before the device is set in operation for supplying chemicals to the pipe line 10, the valves 26 and 77 are closed. The pet cock 18 is opened and the stopper 16 is then removed whereby fresh chemicals may be supplied directly to the storage tank 15. Care must be exercised in filling the tank with chemicals so that the upper end of the pipe line 22 is not covered, otherwise, the chemicals will enter said line. Therefore, the tank should not be filled higher than the lower end of the housing 16ª of plug 16.

After the tank 15 has been filled the stopper is replaced and the pet cock 18 is then closed. Naturally the pet cock 17 is closed and is only opened to drain liquids from the tank.

The valves 26 and 77 are then opened and the device is ready for operation. As the oil containing gases passes through the pipe line 10 and reaches the hood the gases will be freed and gas will enter the hood 20 through the perforation 21 past the check valve 27 and then be discharged through the top 23 of the pipe 22 into the top of the tank 15. These gases which are present naturally in the oil in the pipe line 10 are under pressure and these gases are utilized for creating an equalization of the pressure in the system so that the solution in the tank 15 will flow assisted by gravity to the pipe section 12. As soon as the liquids begin to flow through the pipe line 10 towards the portion 12 of the pipe line the plate 45 will be elevated as well as the lever 50 and since the passage 64 in the valve 62 is so positioned that it will begin to open as soon as the plate 45 is elevated, this valve will then permit liquids from the storage tank 15 to enter the pipe 68. The valve 77 is adjusted so that it will admit a predetermined quantity of the chemicals from the tank 15 to the pipe line 75 and thence to the liquids in the pipe line 10. The sight feed 78 is inspected so that the operator may see how much of the solution is passing the valve 76.

While it is true that the manually operated valve 76 regulates the quantity of the solution supplied to the oil in the pipe line 10, the valve 62 controls the flow of the solution to the valve 76 so that when the flow of the oil is stopped in the pipe line 10 the solution will be cut off to the valve 76 because the free end of the plate 45 will be lowered to the bottom of the casing 30, otherwise, the solution will be passing the valve 76 whether the oil is passing through the pipe line or not.

It is to be borne in mind that whether the well is pumping or not, there is a quantity of gas traveling through the pipe line and the perforations 47 permit the escape of gas through the plate and therefore is not actuated by that gas when no oil is passing through the pipe line.

I claim:

In a device of the character described, a horizontally disposed flow line through which gas and oil under pressure are adapted to flow, a flow responsive device including a casing rectangular in cross section and forming part of the line, a shaft rotatably mounted in the upper portion of said casing and adjacent that end of the casing when the liquid and gas enter the same, a plate secured at one end to the shaft, the opposite or free end being located adjacent the bottom and the other end of the casing, said plate having a plurality of passages adjacent the shaft to permit gas in the line to pass through the casing without disturbing the idle or approximately idle position of the plate, the free end of the plate adapted to be raised by oil flowing through the line for rocking the shaft through a predetermined number of degrees and in accordance with the volume of liquid flowing through said line.

ROY ARCHER.